(12) United States Patent
Lim

(10) Patent No.: US 12,143,339 B2
(45) Date of Patent: Nov. 12, 2024

(54) METHOD AND DEVICE FOR DETECTING SIGNAL INTERFERENCE AMONG GEOGRAPHICALLY CO-LOCATED RADIOS AFFILIATED WITH DIFFERENT TALKGROUPS

(71) Applicant: MOTOROLA SOLUTIONS, INC., Chicago, IL (US)

(72) Inventor: Bing Qin Lim, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 404 days.

(21) Appl. No.: 17/808,400

(22) Filed: Jun. 23, 2022

(65) Prior Publication Data
US 2023/0421334 A1  Dec. 28, 2023

(51) Int. Cl.
| | |
|---|---|
| H04L 5/00 | (2006.01) |
| H04L 5/16 | (2006.01) |
| H04W 4/10 | (2009.01) |
| H04W 72/08 | (2009.01) |
| H04W 72/541 | (2023.01) |
| H04W 72/542 | (2023.01) |

(52) U.S. Cl.
CPC .............. H04L 5/0073 (2013.01); H04L 5/16 (2013.01); H04W 4/10 (2013.01); H04W 72/541 (2023.01); H04W 72/542 (2023.01)

(58) Field of Classification Search
CPC ...... H04L 5/0073; H04L 5/16; H04W 72/542; H04W 72/541; H04W 4/10
See application file for complete search history.

(56) References Cited

U.S. PATENT DOCUMENTS

| | | | |
|---|---|---|---|
| 8,417,242 B2 | 4/2013 | Cormier et al. | |
| 9,351,299 B2 | 5/2016 | Kazmi et al. | |
| (Continued) | | | |

FOREIGN PATENT DOCUMENTS

| | | | |
|---|---|---|---|
| CN | 101491142 B | 8/2013 | |
| FR | 3033112 A1 * | 8/2016 | .............. H04W 4/08 |
| WO | 2021112606 A1 | 6/2021 | |

OTHER PUBLICATIONS

The International Search Report and the Written Opinion, corresponding patent application serial No. PCT/US2023/02347 filed: May 24, 2023, mailed: Sep. 22, 2023, all pages.

Primary Examiner — Melvin C Marcelo
(74) Attorney, Agent, or Firm — Raguraman Kumaresan

(57) ABSTRACT

A process of detecting signal interference among geographically co-located radios affiliated with different talkgroups, An electronic computing device receives a log of push-to-talk (PTT) operations performed at a first radio and a log of audio quality values measured corresponding to audio communications received at a second radio. The first radio is affiliated with a first talkgroup and operates on a first channel frequency assigned to the first talkgroup. The second radio is affiliated with a second talkgroup and further operates on a second channel frequency assigned to the second talkgroup. The device detects that signal interference at the second radio is potentially caused by the first radio when there is a time correlation between a PTT operation performed at the first radio and a change in audio quality at the second radio and when the second radio was geographically co-located with the first radio during the time correlation.

20 Claims, 11 Drawing Sheets

(56) References Cited

U.S. PATENT DOCUMENTS

| | | |
|---|---|---|
| 9,461,696 B1 | 10/2016 | Baker et al. |
| 10,762,927 B2 | 9/2020 | Yang et al. |
| 10,873,951 B1 | 12/2020 | Hiben et al. |
| 2010/0119083 A1 | 5/2010 | Logalbo et al. |
| 2010/0178919 A1 | 7/2010 | Deepak et al. |
| 2014/0233447 A1* | 8/2014 | Ofir .................... H04W 76/45 370/312 |
| 2015/0148088 A1* | 5/2015 | Ericson ................ H04B 15/00 455/501 |
| 2021/0212157 A1* | 7/2021 | Wänstedt ............. H04W 76/36 |
| 2021/0258988 A1 | 8/2021 | Balakrishnan et al. |
| 2024/0107274 A1* | 3/2024 | Wojcik .................. H04W 4/08 |

* cited by examiner

*500*

510 — RECEIVE A LOG OF PTT OPERATIONS PERFORMED AT A FIRST RADIO WHILE THE FIRST RADIO IS AFFILIATED WITH A FIRST TALK GROUP AND OPERATES ON A FIRST CHANNEL FREQUENCY ASSIGNED TO THE FIRST TALKGROUP

520 — RECEIVE A LOG OF AUDIO QUALITY VALUES MEASURED CORRESPONDING TO AUDIO RECEIVED AT A SECOND RADIO WHILE THE SECOND RADIO IS AFFILIATED WITH A SECOND TALKGROUP AND OPERATES ON A SECOND CHANNEL FREQUENCY ASSIGNED TO THE SECOND TALKGROUP

530 — DETERMINE THAT THE AUDIO QUALITY VALUES INDICATE A CHANGE IN AUDIO QUALITY EXCEEDING A PREDETERMINED AUDIO QUALITY THRESHOLD

540 — DETECT THAT A SIGNAL INTERFERENCE AT THE SECOND RADIO IS POTENTIALLY CAUSED BY THE FIRST RADIO WHEN THERE IS A TIME CORRELATION BETWEEN AT LEAST ONE OF THE PTT OPERATIONS PERFORMED AT THE FIRST RADIO AND THE CHANGE IN AUDIO QUALITY AT THE SECOND RADIO AND FURTHER WHEN THE SECOND RADIO WAS GEOGRAPHICALLY CO-LOCATED WITH THE FIRST RADIO DURING THE TIME CORRELATION

*FIG. 5*

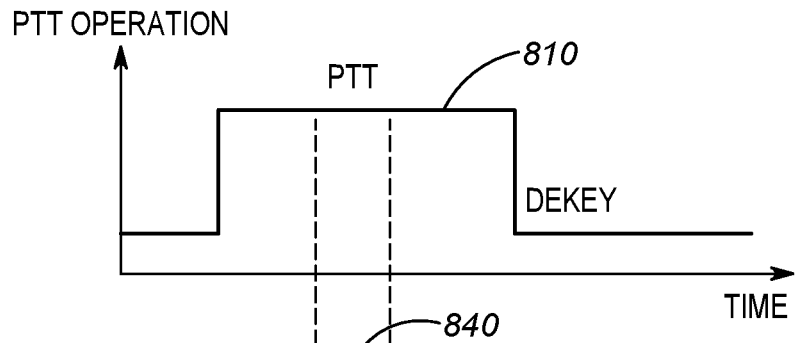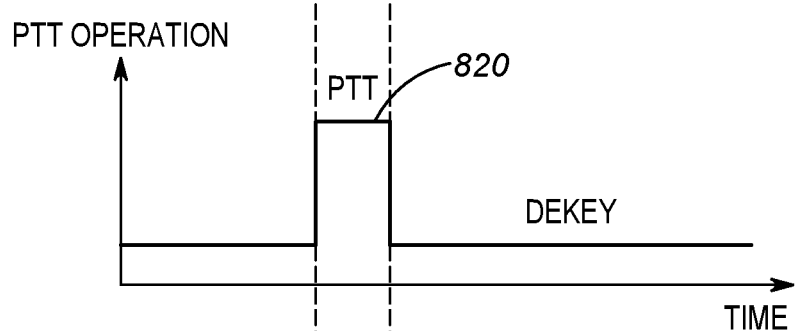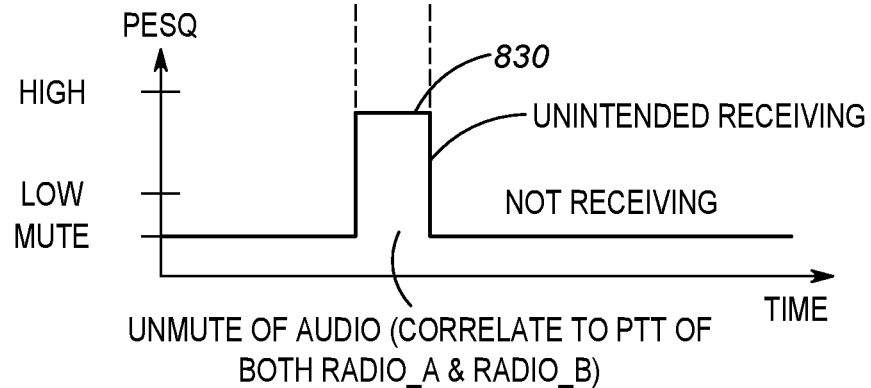
CROSSTALK CAUSING CORRELATED AUDIO UNMUTE
*FIG. 8*

METHOD AND DEVICE FOR DETECTING SIGNAL INTERFERENCE AMONG GEOGRAPHICALLY CO-LOCATED RADIOS AFFILIATED WITH DIFFERENT TALKGROUPS

BACKGROUND

Public-safety personnel increasingly rely upon wireless communication devices such as portable radios for communication. Oftentimes, personnel from multiple agencies such as police departments, fire departments, and other law enforcement departments respond to a public-safety incident to coordinate first response and on-scene rescue efforts with citizens, dispatchers, and other emergency response teams. In such situations, when radios affiliated with different agencies are operated in the same incident area, it is possible for one or more radios to experience performance degradation due to signal interference among the radios. While signal interference is annoying to most users, interference can potentially cause problematic consequences to public-safety personnel responding to public-safety emergencies. Signal interference can reduce the ability of radios to effectively communicate with other remotely located communication devices. Signal interference may result, for example, in communications that are unclear, garbled, or delayed.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 5 is a flowchart of a process of detecting signal interference among geographically co-located radios affiliated with different talkgroups.

FIG. 8 is a timing diagram illustrating an example time correlation between PTT key-up operations performed at first and second radios and unintended audio communications received at a third radio.

Figure 1:
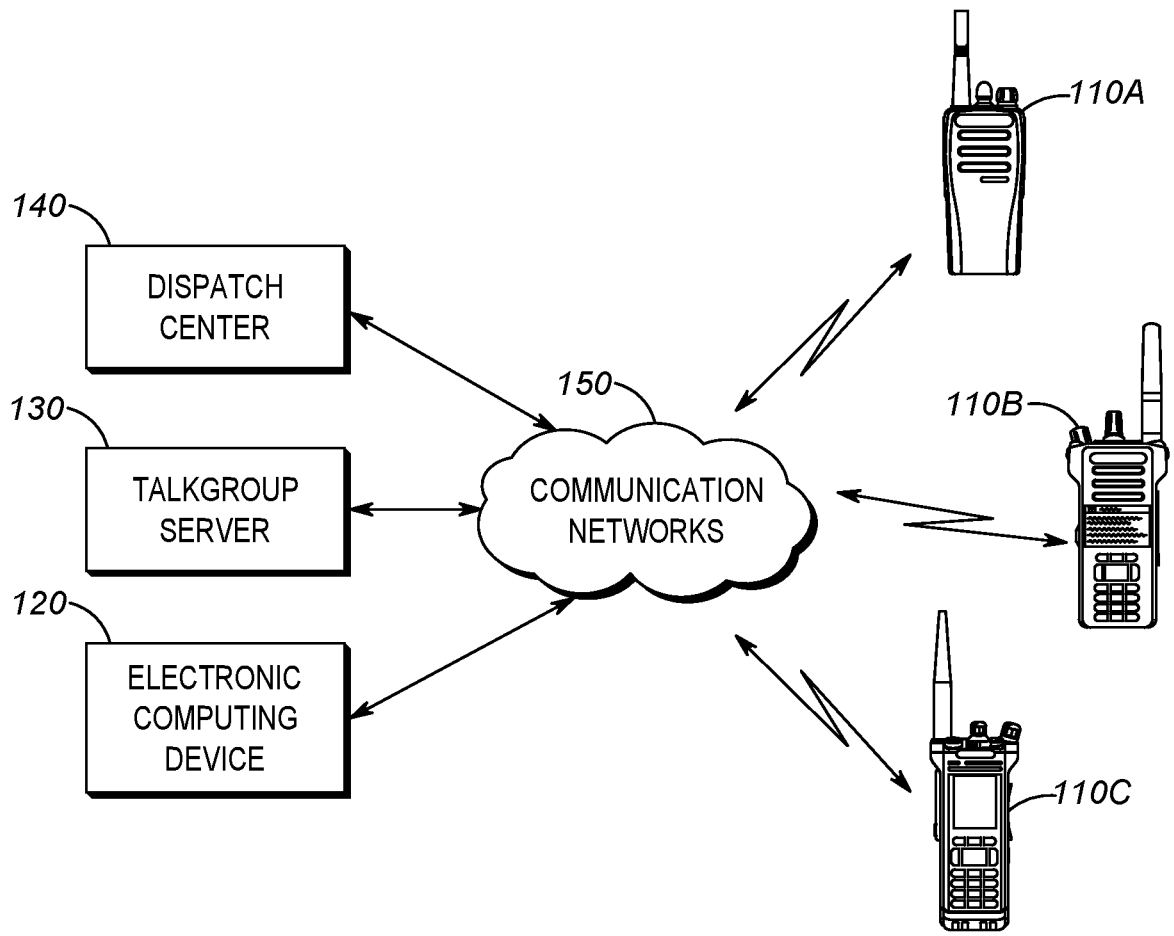
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, signal interference between radios can significantly affect the ability of devices to communicate with one another and with other remotely located devices. In order to effectively mitigate the signal interference between radios, interference mitigation systems should be capable of detecting the cause of interference. A number of factors may contribute to signal interference between radios and these factors vary according to different communication scenarios. In particular, simulation results show that, in communication systems supporting half-duplex talkgroup communications between portable radios, portable radios that are geographically co-located (i.e., radios that are deployed in proximity to one another, for example, in the same incident area) and further affiliated with different talkgroups have often experienced signal interference caused by push-to-talk (PTT) operations at radios. When geographically co-located radios are affiliated with different talkgroups and operated in different transmission/reception channel frequencies, it is possible for radios to experience unwanted spurs while receiving audio communications from another radio affiliated with the same talkgroup. Unwanted spurs may cause crosstalk (e.g., in analog radios configured without private line or digital private line code) or degradation of received audio communications (e.g., in analog radios with private line or digital private line code as well as in analog and digital radios) between radios operating in different channel frequencies (i.e., talkgroup frequencies). For example, simulation results from an analysis of signal output generated by radios of a certain model showed a total of 34 spurs (with spur level as high as −78 dBc) when the radio is keyed up at a channel frequency of 433 MHz. Among the 34 spurs, results indicate that there were seven (7) Fractional-N spurs, fourteen (14) 2×Offset Fractional-N spurs due to voltage controlled oscillator (VCO) 2×FC frequency, and at least six (6) reference spurs within the operating range of the radio. Additional spurs are also expected to be generated at out-of-bands (e.g., Very High Frequency (VHF), 8/900M). In addition, signal interference may arise when there is an intermodulation among different spurs. When the unwanted spurs (or intermodulation among different spurs) that is transmitted wirelessly (unintentionally transmitted when radio transmitting the channel frequency to the air during PTT operation) fall on a receiving radio channel frequency (on victim radio), the unwanted spurs will degrade the receiving radio communication audio or unintentionally unmute audio signals on the receiving radio.

Another cause of interference in talkgroup radios is blocking. For example, assume that a first radio is receiving a weak signal on a first channel frequency from a remotely located radio (e.g., a radio located 4 miles away) and further a second radio transmitting at a second channel frequency (different talkgroup channel frequency from first radio) is deployed in proximity to the first radio. In this case, it is possible that the first radio may suffer a sudden high degradation of audio communications received at the first radio, or even missed audio communications due to a sudden mute of audio communications received at the first radio. This is due to the high power radio frequency (RF) transmission of the second radio at second channel frequency is received by the first radio, saturating the receiver circuit of first radio to non-linear operating region, and thus degrading the receiver sensitivity of first radio in receiving the intended first channel frequency. Since the level of interference (e.g., crosstalk, blocking) experienced in radios during talkgroup communications changes with factors such as the type and make of radios, number of radios geographically co-located to one another in the incident area, channel frequencies operated by the co-located radios, distance between the radios, intermodulation of signals etc., it is impossible to track and know about the spurs that may be experienced by radios prior to their deployment or to generate any pre-planned frequency plan for all involved talkgroups, especially when the talkgroup needs to be set up in a short time and in a dynamic manner during the incident.

Disclosed below is an improved technical process for detecting interference among geographically co-located radios that are affiliated with different talkgroups by leveraging log data obtained from radios affiliated with different talkgroups and further correlating log data pertaining to push-to-talk (PTT) operations performed at one or more co-located radios with changes in audio quality experienced by one or more other co-located radios operating in different channel frequencies.

One embodiment provides a method of detecting signal interference among geographically co-located radios affiliated with different talkgroups. The method comprises: receiving, at an electronic computing device, a log of push-to-talk (PTT) operations performed at a first radio while the first radio is affiliated with a first talkgroup, wherein the first radio operates on a first channel frequency assigned to the first talkgroup; receiving, at the electronic computing device, a log of audio quality values measured corresponding to audio communications received at a second radio while the second radio is affiliated with a second talkgroup, wherein the second radio operates on a second channel frequency assigned to the second talkgroup; determining, at the electronic computing device, that the audio quality values indicate a change in audio quality exceeding a predetermined audio quality threshold; and detecting, at the electronic computing device, that signal interference at the second radio is potentially caused by the first radio when there is a time correlation between at least one of the PTT operations performed at the first radio and the change in audio quality at the second radio and further when the second radio was geographically co-located with the first radio during the time correlation.

Another embodiment provides an electronic computing device comprising a communications interface and an electronic processor communicatively coupled to the communications interface. The electronic processor is configured to: receive, via the communications interface, a log of push-to-talk (PTT) operations performed at a first radio while the first radio is affiliated with a first talkgroup, wherein the first radio operates on a first channel frequency assigned to the first talkgroup; receiving, via the communications interface, a log of audio quality values measured corresponding to audio communications received at a second radio while the second radio is affiliated with a second talkgroup, wherein the second radio operates on a second channel frequency assigned to the second talkgroup; determine that the audio quality values indicate a change in audio quality exceeding a predetermined audio quality threshold; and detect that signal interference at the second radio is potentially caused by the first radio when there is a time correlation between at least one of the PTT operations performed at the first radio and the change in audio quality at the second radio and further when the second radio was geographically co-located with the first radio during the time correlation.

Each of the above-mentioned embodiments will be discussed in more detail below, starting with example system and device architectures of the system in which the embodiments may be practiced, followed by an illustration of processing blocks for achieving an improved technical method, device, and system for method of detecting signal interference among geographically co-located radios affiliated with different talkgroups. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a communication system 100 is shown including a plurality of radio communication devices 110-A, 110-B, 110-C, an electronic computing device 120, a talkgroup server 130, and a dispatch center 140. The plurality of radio communication devices 110-A through 110-C can be interchangeably referred to, collectively, as radio communication devices 110 or radios 110, and generically as a radio communication device 110 or radio 110. The radio 110 may be carried or worn by respective users, for example, public-safety responders, generically referred to as user(s) or talkgroup participant(s). The radio 110, includes, but is not limited to, a battery-powered portable radio used for narrowband and/or broadband direct-mode or infrastructure communications, a battery-powered radio speaker microphone (RSM) video capture device, and vehicular radios. Each radio 110 is affiliated with or subscribed to one or more talkgroups to participate in half-duplex group calls. In the example shown in FIG. 1, the radios 110A, 110-B, and 110-C may each be affiliated with a different talkgroup. For example, the radio 110-A is affiliated with or subscribed to a first talkgroup (or talkgroup 'A'), the radio 110-B is affiliated with or subscribed to a second talkgroup (or talkgroup 'B'), and the radio 110-C is affiliated with or subscribed to a third talkgroup (or talkgroup 'C'). Although only three radios 110-A, 110-B, 110-C are shown, the communication system 100 may include additional radios that are affiliated with different talkgroups including, but not limited to, one or more of the first, second, or third talkgroups with which the radios 110-A, 110-B, and 110-C are respectively affiliated. In addition, in the example shown in FIG. 1, the radios 110-A, 110-B, and 110-C may each be deployed for operation in the same area (for example, when users operating the radios 110-A, 110-B, 110-C are assigned to respond to the same incident), such that, the radios 110-A, 110-B, and 110-C may each be geographically co-located to one another. For example, two or more radios 110 may be identified as "geographically co-located" when operating locations reported by such radios 110 are within a predetermined proximity distance (e.g., 10 meters) or otherwise indicate the same geographical area, address, coordinates, or landmark. Each radio 110 may include one or more wireless communication interfaces for communicating with other entities in the system 100.

The radio 110 may be referred herein as a "member" of one or more talkgroups. While the term "talkgroup" is used in this description, it will be understood by those of skill in the art that a term such as "communication group" or "call group" could be used instead, and that the media data being exchanged during a group call among the participants on the group call could be any suitable type of data, such as combination of one or more of audio, image, video, and the like. Further, the term "talkgroup" is used in this disclosure to refer to a particular group of radios 110 that operate on a common transmission or reception channel frequency specifically assigned to the talkgroup to participate in a group call associated with the talkgroup. In accordance with some embodiments, each radio 110 includes a push-to-talk (PTT) input (e.g., a PTT key or button) that when activated by a user (e.g., by pressing the PTT key or button) causes the corresponding radio 110 to send a signal to the talkgroup server 130 to request allocation of communication resources (e.g., a channel frequency) for enabling the radio 110 to transmit signals (e.g., audio communications) to other participants i.e., other radios 110 affiliated with the same talkgroup as the transmitting radio 110. A soft push-to-talk (PTT) input may also be provided for this purpose, for example, via a touch interface on a display screen of the radio 110.

In accordance with embodiments, each radio 110 maintains a log of PTT operations which were performed at the radio 110 while the radio 110 was being affiliated with one or more talkgroups. The PTT operation corresponds to a PTT key-up operation or a PTT-key release operation. A PTT key-up operation is detected at the radio 110, for example, when a user presses the PTT key or button at the radio 110. Performing the PTT key-up operation at the radio 110 results in acquiring a channel frequency (e.g., a transmission channel frequency allocated for a particular talkgroup with which the radio 110 is affiliated). In accordance with some embodiments, after the channel frequency is acquired by the radio 110, audio communications from the radio 110 to other radios that are affiliated with the same talkgroup are transmitted on the acquired channel frequency as long as the PTT key or button remains depressed or is not released by the user. On the other hand, a PTT key-release operation (also referred to as a "dekey" operation) is detected at the radio 110, for example, when a user releases the PTT key or button. Performing the PTT key-release operation at the radio 110 results in releasing the acquired channel frequency and ceasing transmission of audio communications to other radios 110 that are affiliated with the same talkgroup. In accordance with embodiments, the radios 110 operate in a half-duplex communication mode, where only one radio 110 operating in a talkgroup is granted a floor (i.e., only one radio acquires a transmission channel frequency during a PTT-key-up operation) at any given time to transmit audio communications. At the time of PTT key-up operation at a transmitting radio 110, other radios 110 affiliated with the same talkgroup can receive audio communications from the transmitting radio 110, but cannot initiate transmission of its own audio communications unless the floor granted to the transmitting radio is revoked and a new floor is granted to another radio 110 (e.g., in response to a PTT key-up operation initiated at the other radio 110).

In accordance with embodiments, each radio 110 periodically or in response to a request, transmits the maintained log of PTT operations to an electronic computing device 120. The electronic computing device 120 is any computing device or infrastructure server that is configured to detect signal interference among geographically co-located radios 110 (e.g., radios 110-A, 110-B, 110-C shown in FIG. 1) affiliated with different talkgroups. In one embodiment, the electronic computing device 120 is implemented within the talkgroup server 130. In accordance with embodiments, the electronic computing device 120 detects signal interference experienced by radios 110 that are geographically co-located at the incident area by correlating in time a log of PTT operations performed at radios (e.g., radio 110-A) affiliated with one talkgroup with a log of audio quality values measured corresponding to audio communications received at one or more other radios (e.g., radios 110-B, 110-C) affiliated with other talkgroups.

The talkgroup server 130 may be, for example, a radio controller, push-to-talk (PTT) server, zone controller, mobile management entity (MME), base station controller (BSC), mobile switching center, site controller, call controller, or other network device. While the talkgroup server 130 is illustrated as a separate entity in the system 100, the talkgroup server 130 may be integrated with other devices (such as a zone controller) in a communication network 150 (e.g., within a base station or infrastructure radio access network). The talkgroup server 130 may be configured to provide registration, authentication, encryption, routing, and/or other services to radio communication devices 110 operating within the coverage area of a base station. In accordance with some embodiments, the talkgroup server 130 controls allocations of communication resources (e.g., frequency channels) required to establish a group call between radios 110 that are affiliated with the same talkgroup. The talkgroup server 130 additionally tracks or has access to talkgroup subscription information. The talkgroup subscription information identifies each talkgroup by a unique talkgroup identifier. Each talkgroup is associated with a plurality of call participants or members (i.e., radios 110). Each call participant is identified by a unique identifier associated with a radio 110 and/or a user operating the radio 110. For example, a participant associated with a talkgroup may be identified by a device identifier (ID) such as a hardware ID, hardware Media Access Control (MAC) address, Internet Protocol (IP) address, radio ID, International Mobile Subscriber Identity (IMSI), a serial number, user name, user ID, or some other unique identifier that can be used to identify subscribed participant radios 110 or users.

A dispatch center 140 may be directly coupled to the talkgroup server 130, or may be indirectly coupled to the talkgroup server 130 via one or more internal or external networks (e.g., communication networks 150). The dispatch center 140 may include a dispatch console that allows an administrator or dispatcher to initiate infrastructure-sourced group communications to radios 110 that are affiliated with the same talkgroup, among other features and functions. In accordance with some embodiments, the dispatch center 140 may also be added to one or more talkgroups as a participant of the talkgroups, to transmit and/or listen to communications on the talkgroups. As an example, the dispatch center 140 receives a notification of occurrence of an incident (e.g., a fire incident) in an area (e.g., in a building) and may transmit information associated with the incident to radios 110 associated with public-safety personnel who may be assigned to respond to the incident. In accordance with some embodiments, the dispatch center 140 may assign first responders to respond to the incident and further instruct the talkgroup server 130 to set up a group call among the first responders assigned to the incidents. The dispatch center 140 may also select additional participants for the group call. For example, in case of a fire incident in a building, a dispatcher may, via the dispatch console at the dispatch center 140, may select public-safety personnel from different agencies (e.g., police, fire, medical agencies, etc.) to respond to the incident. In this example, since public-safety personnel from multiple agencies are assigned to respond to the same incident, radios 110 that are used by the public-safety personnel may be affiliated with different talkgroups and further may operate on different channel frequencies while being deployed in the same incident area. As an example, the radio 110-A may be operated by a public-safety responder associated with a first agency such as a police department and accordingly, the radio 110-A may be affiliated with talkgroup 'A' to communicate with other responders affiliated with the same talkgroup i.e., talkgroup 'A'. Similarly, the radio 110-B may be operated by a public-safety responder associated with a second agency such as a fire department and accordingly, the radio 110-B may be affiliated with talkgroup 'B' to communicate with other responders affiliated with the same talkgroup i.e., talkgroup 'B'. Also, the radio 110-C may be operated by a public-safety responder associated with a third agency such as a emergency medical department and accordingly, the radio 110-C may be affiliated with talkgroup 'C' to communicate with other responders affiliated with the same talkgroup i.e., talkgroup 'C'. In this situation, since the radios 110-A, 110-B, 110-C affiliated with multiple talkgroups are each assigned to the same incident, the radios 110-A, 110-B, 110-C may be geographically co-located during their communication with their respective talkgroups 'A', 'B', 'C'. As previously described, when radios 110 affiliated with multiple talkgroups are geographically co-located, it is possible for radios 110 to experience signal interference.

The radios 110, electronic computing device 120, talkgroup server 130, and dispatch center 140 may communicate with one another via communication networks 150. As an example, the electronic computing device 120 may receive, from the talkgroup server 130, talkgroup subscription information associated with radios 110 that are participating in talkgroup communications in an incident area. As another example, the electronic computing device 120 may receive, from the dispatch center 140, information related to responders (and the corresponding radios operated by them) dispatched to respond to an incident. The communication networks 150 may include communications infrastructure such as a base station that work in tandem with infrastructure radio access network (RAN) (which in some embodiments include entities such as talkgroup server 130 and dispatch center 140) to provide infrastructure wireless group communication services to radio communication devices 110 that are within a wireless transmission range of the base station. The infrastructure RAN may include one or more elements such as additional base stations, base station controllers, router, switches, gateways, and the like, arranged, connected, and programmed to provide wireless service to radio communication devices 110. The communication system 100 could take the form of a public-safety radio network or commercial broadband network. In accordance with some embodiments, external networks (not shown) may be made accessible to radios 110 via infrastructure RAN. External networks may include, for example, a public switched telephone network (PSTN), a plain old telephone (POT) system, a wide-area packet-switched network such as the Internet, or another wired or wireless service provider's network, among other possibilities. The communication networks 150 may implement one or more radio access technologies (RATs) and may communicate with radios 110 over respective air-interface links according to the one or more RATs. Example RATs include a direct-mode, conventional, or infrastructure-mode trunked land-mobile-radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RATs operate in accordance with standard and/or protocols such as Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application. While FIG. 1 illustrates an example in which all radios 110 use the same RAT, in other embodiments, each radio 110 or set of radios 110 may use different RATs to communicate with one or more same or different infrastructure RAN.

Downlink communications over air-interface links may be addressed to radios 110 (e.g., multicast or broadcast using an identifier, such as a Subscriber Group ID (SGID), that is associated with a talk group), and/or to one or more single communication devices (e.g., unicast using an identifier, such as a Subscriber Unit Identifier (SUID), that is uniquely associated with that communication device), among other possibilities that are known to those of skill in the art.

In addition to infrastructure wireless air-interface links communicatively coupling the radios 110 to the communication networks 150, radios 110 may also maintain ad-hoc or direct-mode ("ad-hoc") air-interface links without any intervening infrastructure between them. For example, a radio 110 may be wirelessly coupled to another radio 110 via a direct-mode air interface link (not shown) in accordance with one or more direct-mode air-interface protocols, such as direct-mode land-mobile-radio (LMR), as long as the devices are within mutual transmission range of one another.

Figure 2:
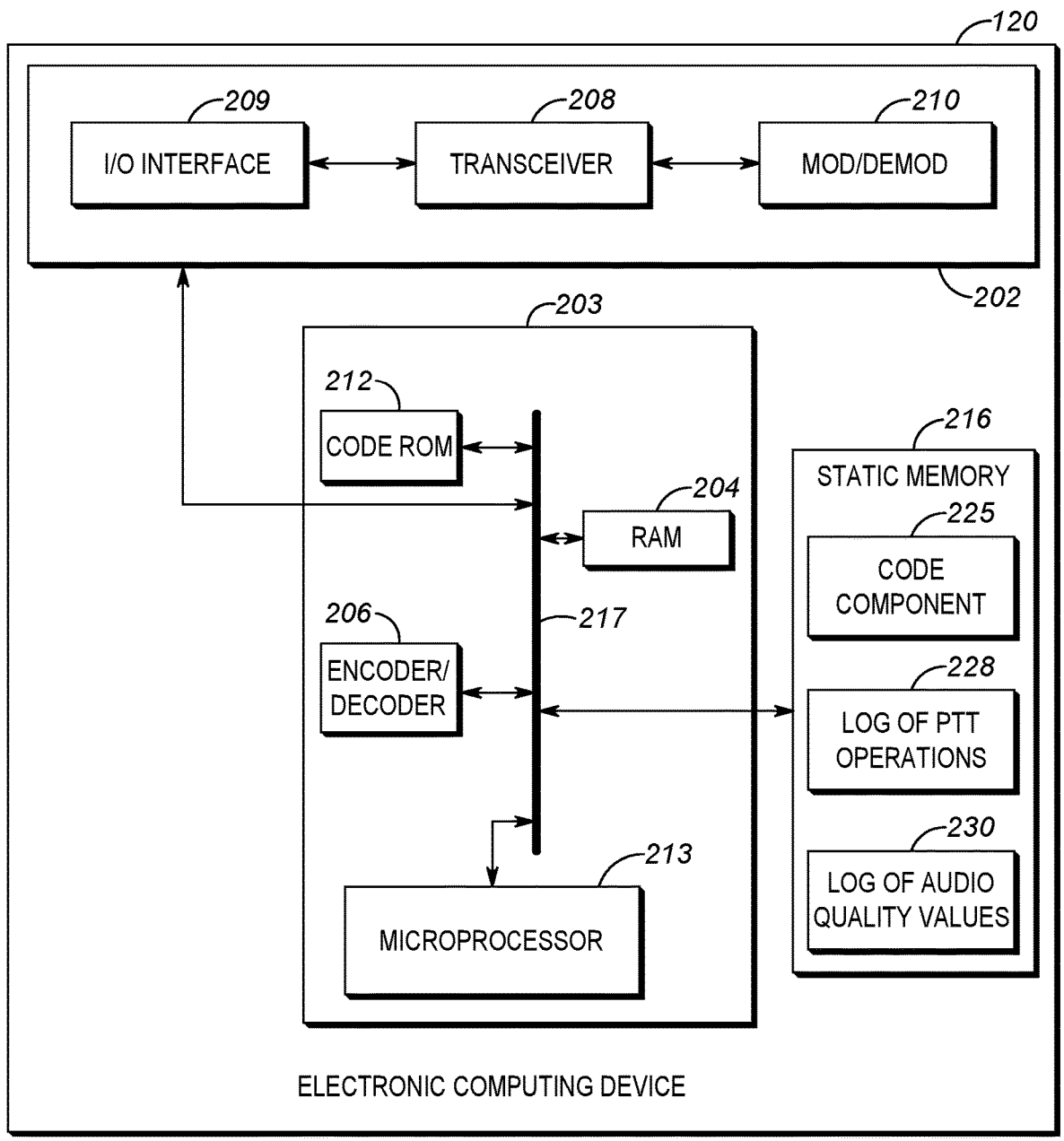
FIG. 2 is a block diagram of an electronic computing device shown in FIG. 1 in accordance with some embodiments.

Now referring to FIG. 2, a schematic diagram illustrates an electronic computing device 120 according to some embodiments of the present disclosure. The electronic computing device 120 may be a standalone device or alternatively embodied in another infrastructure server such as the talkgroup server 130 or dispatch center 140 within the system 100. In one embodiment, functions of the electronic computing device 120 may be implemented at one or more of the radios 110 participating in talkgroup communications. In one embodiment, the electronic computing device 120 may be implemented as a distributed computing device across two or more of the foregoing (or multiple of the same type of one of the foregoing) and linked via a wired and/or wireless communication link(s). The electronic computing device 120 may also be implemented in a cloud computing platform. While FIG. 2 may represent the devices as described above with respect to FIG. 1, depending on the type of the device, the electronic computing device 120 may include fewer or additional components in configurations different from that illustrated in FIG. 2.

As shown in FIG. 2, the electronic computing device 120 includes a communications unit or communications interface 202 coupled to a common data and address bus 217 of the processing unit 203. The communications unit 202 may include one or more wired or wireless input/output (I/O) interfaces 209 that are configurable to communicate with radios 110, talkgroup server 130, dispatch center 140, and/or with other devices in or communicably coupled to the system 100. The communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, an LTE or transceiver, and/or other similar type of wireless transceiver configurable to communicate via a wireless radio network. The communications unit 202 may additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210 that is coupled to an encoder/decoder 206 of the processing unit 203.

The processing unit 203 may include the encoder/decoder 206 with an associated code Read Only Memory (ROM) 212 for storing data for initializing system components, and encoding and/or decoding voice, data, control, or other signals that may be transmitted or received between the electronic computing device 120 and other devices in the system 100. The processing unit 203 includes an electronic processor or microprocessor 213 coupled, by the common data and address bus 217, to the encoder/decoder 206, a Random Access Memory (RAM) 204, and a static memory 216.

Static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few. Static memory 216 stores operating code 225 for the electronic processor 213 that, when executed, performs one or more of the functions set forth in FIG. 5 and accompanying text. Static memory 216 may store (or electronic computing device 120 has access to, via communications unit 202) permanently or temporarily, a log of PTT operations 228 performed at radios 110 and a log of audio quality values 230 measured (e.g., at predefined time intervals) corresponding to audio communications received at radios 110.

In accordance with some embodiments, the log of PTT operations stored corresponding to each particular radio 110 (e.g., radio 110-A participating in talkgroup communications) includes information related to one or more of: a type of PTT operation (e.g., PTT key-up operation or PTT key-release operation) performed at the particular radio 110, a timestamp indicating a time at which the PTT operation was performed at the particular radio 110, a device identifier assigned to the particular radio 110, location of the particular radio 110 during the time at which the PTT operation was performed, a talkgroup identifier identifying a talkgroup with which the particular radio 110 was affiliated at the time the PTT operation was performed, and a channel frequency (i.e., a channel frequency acquired by the particular radio 110 during the PTT key-up operation) assigned to the talkgroup with which the particular radio was affiliated. In accordance with embodiments, since a radio 110 may perform multiple PTT key-up operations or PTT key-release operations while participating in group communications with other radios 110 affiliated with the same talkgroup, the log of PTT operations 228 stored corresponding to any particular radio 110 may identify multiple sets of PTT operations detected at the particular radio 110 as well as multiple timestamps indicating the different time periods during which the corresponding PTT controls or operations were detected at the particular radio 110.

The log of audio quality values 230 includes perceptual evaluation of speech quality (PESQ) values or other suitable audio quality metrics. The log of audio quality values 230 stored corresponding to a particular radio 110 (e.g., radio 110-B participating in talkgroup communications) may further include information related to one or more of: received signal strength indication (RSSI) values, a timestamp indicating a time at which the PESQ and RSSI values were measured at the particular radio 110, a device identifier assigned to the particular radio 110, mute or unmute identifier indicating whether the particular radio 110 was muted or unmuted when corresponding audio communications were received at the particular radio 110, location of the particular radio during the time at which the PESQ and RSSI values were measured, a talkgroup identifier identifying a talkgroup with which the particular radio was affiliated at the time the audio quality values were measured, and a channel frequency (i.e., a channel frequency on which audio communications contributing to the audio quality values were received) assigned to the talkgroup. In accordance with embodiments, the electronic computing device 120 detects signal interference among geographically co-located radio communication devices by correlating in time and location a log of PTT operations performed at radios affiliated with one talkgroup with a log of audio quality values measured corresponding to audio communications received at radios affiliated with one or more other talkgroups.

Figure 3:
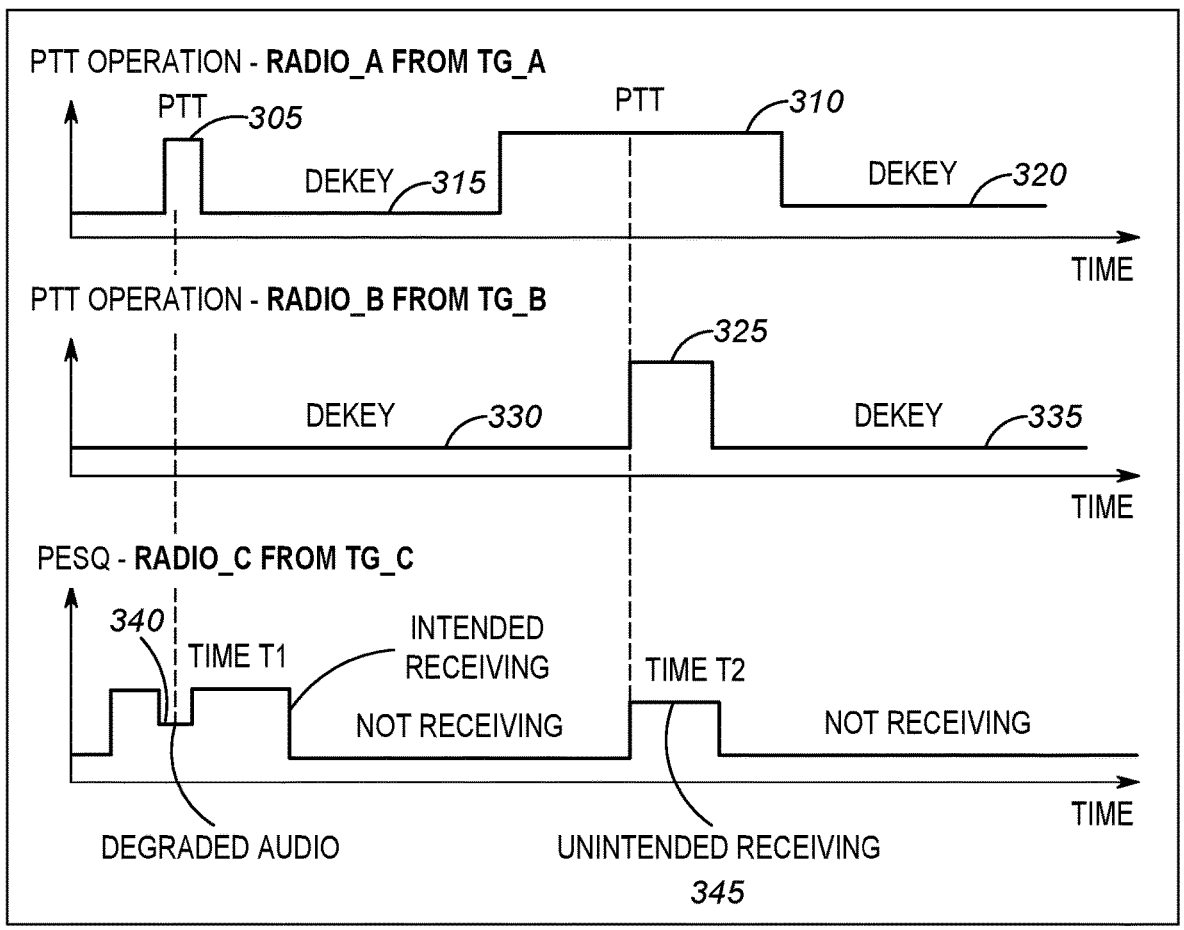
FIG. 3 is a timing diagram illustrating time correlations between PTT operations performed at first and second radios and changes in audio quality measured corresponding to audio communications received at a third radio.

Referring to FIG. 3, a timing diagram 300 is shown illustrating time correlations between PTT controls or operations performed at radios 110-A, 110-B and changes in audio quality detected corresponding to audio communications received at the radio 110-C. In accordance with embodiments, a change in audio quality is detected based on differences between two or more audio quality values measured over a given period of time. In accordance with some embodiment, a correlation of PTT operations is performed only with those changes in audio quality that exceed a predetermined audio quality threshold (e.g., PESQ degraded at a value of 1.5). In the example shown in FIG. 3, a log of PTT operations 228 stored corresponding to the radio 110-A ("radio-A") affiliated with talkgroup 'A' ("TG_A") may identify: (i) a PTT key-up operation 305 detected during time 'T1' at the radio 110-A; (ii) a PTT key-up operation 310 detected during time 'T2' at the radio 110-A; and (iii) PTT key-release or dekey operations 315, 320 detected at time periods other than 'T1' or 'T2' at the radio 110-A. Similarly, a log of PTT operations 228 stored corresponding to the radio 110-B ("radio_B") affiliated with talkgroup 'B' ("TG_B") may identify (i) a PTT key-up operation 325 detected during time 'T2' at the radio 110-B and (ii) PTT key-release operations 330, 335 detected at time periods other than 'T2' at the radio 110-B. On the other hand, as illustrated in FIG. 3, a log of audio quality values 230 stored corresponding to the radio 110-C ("radio_C") affiliated with talkgroup 'C' ("TG_C") may identify (i) a change in audio quality 340 indicating degradation of audio communications received at the radio 110-C during time 'T1' and (ii) a change in audio quality (e.g., a change indicating substantial difference between two consecutively measured audio quality values) indicating unintended audio communications 345 received at the radio 110-C during time 'T2'. Since all the three radios, 110-A, 110-B, 110-C are in three different talkgroups with different channel frequencies, they are not intended to be communicating to each other. In other words, the radio 110-C should not be receiving audio communication or being impacted by any PTT operation by radio 110-A and 110-B. Any impact to audio communications received at the radio 110-C due to PTT operation by radio 110-A and/or 110-B is considered unintentional interference. The determination of this unintentional interference or cross talkgroup communication is determined by detecting a mismatch of the talkgroup identifiers and the channel frequencies assigned, as logged by the radios 110-A, 110-B, and 110-C. In accordance with some embodiments, the electronic computing device 120 detects signal interference (interference on its intended receiving audio communication by other radio of the same talkgroup, TG_C, that not shown in this figure) at the radio 110-C potentially contributed by PTT operations performed at radio 110-A that was geographically co-located with the radio 110-C based on a time correlation between the PTT key-up operation 305 performed during time 'T1' at the radio 110-A and a corresponding degradation of audio communications 340 received during the same time 'T1' at the radio 110-C. The electronic computing device 120 may also detect another signal interference at the radio 110-C based on a time correlation between PTT key-up operations 310, 325 respectively performed during time 'T2' at radios 110-A, 110-B that were geographically co-located with the radio 110-C and a corresponding unintended audio communications 345 received during the same time 'T2' at the radio 110-C.

Figure 4:
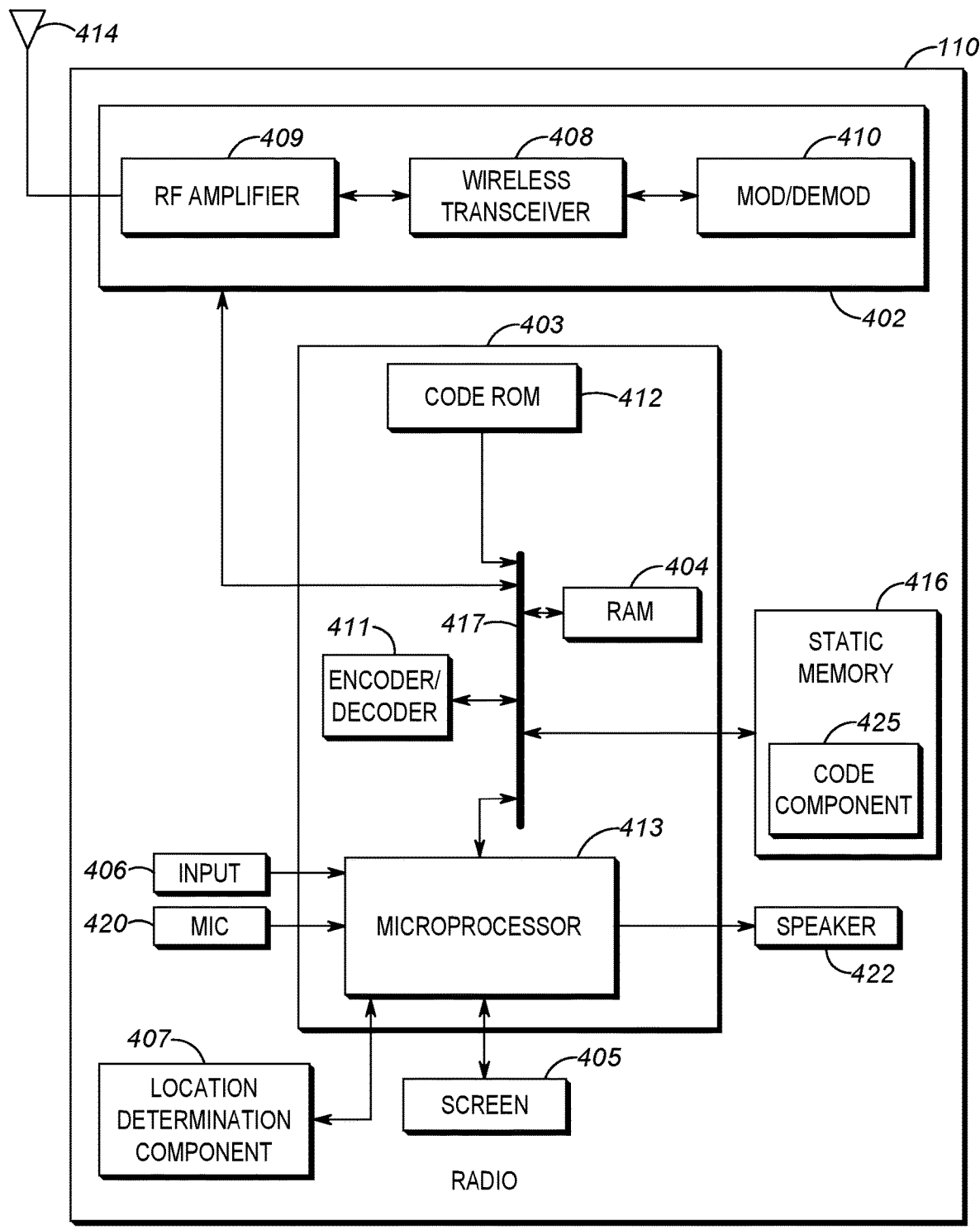
FIG. 4 is a block diagram of a radio shown in FIG. 1 in accordance with some embodiments.

FIG. 4 is an example functional block diagram of a radio 110 operating within the communication system 100 in accordance with some embodiments. While FIG. 4 represents a radio 110 described above with respect to FIG. 1, depending on the type of radio, the radio 110 may include fewer or additional components in configurations different from that illustrated in FIG. 4.

As shown in FIG. 4, the radio 110 includes a radio frequency communications unit 402 coupled to a common data and address bus 417 of a processing unit 403. The radio 110 may also include a display screen 405 and an input 406, each coupled to be in communication with processing unit 403. The input 406 may include an alphanumeric physical keypad (or virtual keypad in cooperation with capacitive touch display screen 405) for inputting text for communications. In accordance with some embodiments, the input 406 may include a suitable interface, for example, a hardware or graphical user interface PTT button that functions to activate a transmit function in a half-duplex communication mode, transitioning the radio 110 (when activated) from a listen-only mode to a transmit-only mode for half-duplex communication. The display screen 405 may further function to display communications received via communications unit 402 from other devices. In accordance with some embodiments, the radio 110 may display instructions (e.g., instructions received from the electronic computing device 120) to mitigate further signal interference at the radio 110. A microphone 420 captures speech input from a user that is further vocoded by processing unit 403 and transmitted as voice, text, or multimedia data by communications unit 402 to other communication devices in the system 100. A communications speaker 422 reproduces audio that is decoded from voice data transmissions received from other communication devices via the communications unit 402. In accordance with some embodiments, the radio 110 may output audio instructions received from the electronic computing device 120 to mitigate further signal interference at the radio 110.

The radio 110 further includes a location determination component 407 that determines a location of the radio 110. The location determination component 407 may include a satellite receiver (e.g., a global positioning system (GPS) receiver, Global navigation satellite system (GLONASS) receiver, etc.) that determines the location of the radio 110 based on one or more signals received from the satellites. The location determination component 407 may also be implemented using other technologies, for example, a wireless fidelity (WiFi) positioning system that uses triangulation of WiFi signals received from multiple wireless access points for a given position of the radio 110 to determine the location of the radio 110 and a cellular positioning system that uses cellular information from base stations to determine the location of the radio 110. Accordingly, the location may be determined as one or more of a street address, an intersection, a global positioning system (GPS) location, an elevation, a triangulated location, a uniquely identified structure (such as a particular subway, train line, road, building, or building floor), a location coordinate, or some other form of location identifier. In accordance with some embodiments, the radio 110 reports (e.g., via a LMR reverse channel), periodically or in response to a specific request, to the electronic computing device 120, its location along with a log of PTT operations 228 (e.g., PTT key-up operation or PTT key-release operation) performed at the radio 110 as well as a log of audio quality values 230 measured corresponding to audio communications received at the radio 110.

The processing unit 403 also includes an encoder/decoder 411 with an associated code Read Only Memory (ROM) 412 for storing data for initializing system components and encoding and/or decoding voice or other traffic information (including image data, audio data, video data, text data, control signals, etc.) that may be transmitted or received by the radio 110. The processing unit 403 may further include a microprocessor or an electronic processor 413 coupled, by the common data and address bus 417, to the encoder/decoder 411, a random access memory (RAM) 404, and a static memory 416.

The radio frequency communications unit 402 is a combined receiver and transmitter (e.g., transceiver) having a common antenna 414. The radio frequency communications unit 402 has a wireless transceiver 408 coupled to the antenna 414 via a radio frequency amplifier 409. The wireless transceiver 408 may be a transceiver operating in accordance with one or more standard protocols, such as a digital mobile radio (DMR) transceiver, a Project 25 (P25) transceiver, a terrestrial trunked radio (TETRA) transceiver, a Bluetooth transceiver, a long term evolution (LTE) transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The wireless transceiver 408 is also coupled to a combined modulator/demodulator (MOD/DE-MOD) 410 that is coupled to the encoder/decoder 411.

The electronic processor 413 has ports for coupling to the display screen 405 and to the input 406. The electronic processor 413 further has ports for coupling to the microphone 420 and to the speaker 422. The electronic processor 413 may include a microprocessor, a logic circuit, an application-specific integrated circuit (ASIC), a field-programmable gate array (FPGA), or another suitable electronic device. In some embodiments, the static memory 416 may store operating code 425 for the electronic processor 413 that, when executed by the electronic processor 213, performs one or more of the operations set forth in FIG. 5 and accompanying text. Static memory 416 may comprise, for example, a hard disk drive (HDD), an optical disk drives (ODD) such as a compact disk (CD) drive or digital versatile disc (DVD) drive, a solid-state drive (SSD), a tape drive, a flash memory drive, or a tape drive, to name a few. In accordance with embodiments, the static memory 416 stores a log of PTT operations (e.g., PTT key-up operations and PTT key-release operations) detected at the radio 110 along with a timestamp (indicating a time at which the respective PTT operations were detected at the radio 110) and location of the radio 110. The static memory 416 may also additionally store a log of audio quality values (e.g., PSEQ values) measured corresponding to audio communications received at the radio 110.

Turning now to FIG. 5, a flowchart diagram illustrates a process 500 for detecting signal interference among geographically co-located radios affiliated with different talkgroups. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure. A corresponding electronic computing device, such as the electronic computing device 120 of FIG. 2, and embodied as a singular electronic computing device or distributed electronic computing device as set forth earlier, may execute process 500. The electronic computing device 120 may execute the process 500 at power-on, at some predetermined periodic time period thereafter, in response to a trigger raised locally at the device via an internal process (e.g., in response to detecting that a group call is established between radios 110 of participants after an occurrence of an incident), or via an input interface (e.g., a user such as a dispatcher enabling a particular feature associated with the process 500 by activating a button at the dispatch center 140 and/or at the electronic computing device 120), among other possibilities.

The process 500 of FIG. 5 need not be performed in the exact sequence as shown and likewise various blocks may be performed in different order or alternatively in parallel rather than in sequence. Accordingly, the elements are referred to herein as "blocks" rather than "steps." The process 500 may be implemented on variations of the system 100 of FIG. 1 as well.

Process 500 begins at block 510 where the electronic computing device 120 receives a log of PTT operations performed at a first radio (e.g., radio 110-A) while the first radio is affiliated with a first talk group (e.g., talkgroup 'A') and operates a first channel frequency (e.g., a transmission channel frequency of 356.275 MHz) assigned to the first talkgroup. In accordance with some embodiments, each radio 110 (e.g., radios 110-A, 110-B, 110-C) participating in talkgroup communications (e.g., in an incident area) may be configured to automatically collect a log of PTT operations that were detected at the respective radio 110 and further periodically (or in response to a specific request received from the electronic computing device 120) transmit the log of PTT operations to the electronic computing device 120 via the communication networks 150. In accordance with some embodiments, the electronic computing device 120 may receive and store logs of PTT operations from multiple radios 110 that may be geographically co-located to one another. The radios 110 may transmit the log of PTT operations to the electronic computing device 120 via a narrowband (e.g., LMR network) or a broadband communications network 150 (e.g., LTE or WiFi network). For instance, the radio 110 may include the log of PTT operations in a signal transmitted on a reverse LMR channel, an LMR beacon, or a signal header. In accordance with some embodiments, the log of PTT operations received from a particular radio 110 (e.g., radio 110-A) includes information related to one or more of: a type of PTT operation (e.g., PTT key-up operation or PTT key-release operation) performed at the particular radio 110, a timestamp indicating a time at which the PTT operation was performed at the particular radio 110, a device identifier assigned to the particular radio 110, location of the particular radio 110 during the time at which the PTT operation was performed, a talkgroup identifier identifying a talkgroup with which the particular radio 110 was affiliated at the time the PTT operation was performed, and a channel frequency (i.e., a channel frequency acquired by the particular radio during the PTT key-up operation) assigned to the talkgroup with which the particular radio was affiliated. In accordance with embodiments, since a radio 110 may perform multiple PTT key-up operations or PTT key-release operations while participating in group communications with other radios 110 affiliated with the same talkgroup, the log of PTT operations 228 received from a particular radio 110 may identify multiple sets of PTT operations detected at the particular radio 110 as well as multiple timestamps indicating the different time periods during which the respective PTT operations were detected at the particular radio 110.

At block 520, the electronic computing device 120 receives a log of audio quality values measured (e.g. at predefined time intervals) corresponding to audio communications received at a second radio (e.g., radio 110-B) while the second radio is affiliated with a second talkgroup and operates on a second channel frequency (e.g., a reception channel frequency of 366.95 MHz) assigned to the second talkgroup. In accordance with some embodiments, each radio 110 participating in talkgroup communications (e.g., in an incident area) may be configured to automatically measure a log of audio quality values corresponding to audio communications received at the respective radio 110 and further periodically (or in response to a specific request received from the electronic computing device 120) transmit the log of PTT audio quality values to the electronic computing device 120. In accordance with some embodiments, the electronic computing device 120 may store logs of audio quality values received from multiple radios 110 that may be geographically co-located to one another. The radios 110 transmit the log of audio quality values to the electronic computing device 120 via a narrowband (e.g., LMR network) or a broadband communications network 150 (e.g., LTE or WiFi network). For example, the radio 110 may include the log of audio quality values in a signal transmitted on a reverse LMR channel, an LMR beacon, or a signal header. The log of audio quality values 230 includes perceptual evaluation of speech quality (PESQ) values or other suitable audio quality metrics. The log of audio quality values 230 stored corresponding to a particular radio 110 may further include information related to one or more of: received signal strength indication (RSSI) values, a timestamp indicating a time at which the PESQ and RSSI values (or other suitable audio quality metrics) were measured at the particular radio 110, a device identifier assigned to the particular radio 110, a mute or unmute identifier indicating whether the radio 110 was muted or unmuted when corresponding audio communications were received at the radio 110, location of the particular radio during the time at which the PESQ and RSSI values were measured, a talkgroup identifier identifying a talkgroup with which the particular radio was affiliated at the time the audio quality values were measured, and a channel frequency (i.e., a channel frequency on which audio communications contributing to the measurement of audio quality values were received) assigned to the talkgroup.

At block 530, the electronic computing device 120 determines whether the audio quality values included in the log of PTT audio quality values received from the second radio indicate a change in audio quality (e.g., relative to a given time period of 2 seconds) exceeding a predetermined audio quality threshold (e.g., degraded with a value of 1.5, or from unmute to mute). In accordance with embodiments, the electronic computing device 120 monitors changes in audio quality values that exceed a predetermined audio quality threshold for every radio (e.g., radios 110-A, 110-B, 110-C that are geographically co-located to one another in an incident area) participating in talkgroup communications. If the electronic computing device 120 determines that the audio quality values received from the second radio (e.g., radio 110-B) indicate a change in audio quality exceeding a predetermined audio quality threshold, then the electronic computing device 120 further determines if the change in audio quality is due to signal interference caused by PTT operations performed by a geographically co-located radio (e.g., radio 110-A) affiliated with a talkgroup different from the second radio's talkgroup.

At block 540, the electronic computing device 120 detects that signal interference at the second radio (e.g., radio 110-B) is potentially caused by the first radio (e.g., radio 110-A) when there is a time correlation between at least one of the PTT operations (e.g., PTT key-up operation) performed at the first radio and the change in audio quality at the second radio and further when the second radio was geographically co-located with the first radio during the time correlation. In accordance with embodiments, the electronic computing device 120 determines that the first and second radios were geographically co-located to one another during the time correlation when a first location included in the log of PTT operations received from the first radio matches or is within a predefined geographical distance from a second location included in the log of PTT quality values received from the second radio.

In accordance with some embodiments, the electronic computing device 120 may similarly detect signal interference at other radios that are affiliated with the same talkgroup as the second radio (e.g., radio 110-B) based on a time correlation between a PTT-key operation performed at the first radio (or another radio that is affiliated with the same talkgroup as the first radio) and a change in audio quality corresponding to audio communications received at the other radios and further when the other radios were geographically co-located with the first radio during the time correlation.

In accordance with some embodiments, the electronic computing device 120 may further receive a log of PTT operations performed at a third radio (e.g., radio 110-C) while the third radio is affiliated with a third talkgroup and operates on a third channel frequency (e.g., a reception channel frequency of 396.5 MHz) assigned to the third talkgroup. In this case, the electronic computing device may detect that the signal interference at the second radio (e.g., radio 110-B) is potentially caused by an intermodulation of signals between the first and third radios (e.g., radios 110-A, 110-C) when there is a time correlation between at least one of the PTT operations (e.g., PTT key-up operations) performed at the first radio, at least one of the PTT operations (e.g., PTT key-up operations) performed at the third radio, and a change in audio quality at the second radio and further when the second radio is geographically co-located with the first and third radios during the time correlation. The intermodulation of signals can be caused by intermodulation of signal between interference spur of the first radio 110-A and interference spur of the third radio 110-C, interference spur of the first radio 110-A and channel frequency of the third radio 110-C, or channel frequency of the first radio 110-A and interference spur of the third radio 110-C. The resulting interference spur due to one of the intermodulation of signals falls on the channel frequency of the second radio 110-B thus degrading the audio quality of the second radio 110-B or unintentionally unmuting the second radio 110-B.

In accordance with embodiments, the electronic computing device 120 further identifies a cause of interference (e.g., crosstalk, blocking, intermodulation etc.) detected at the second radio and initiates an interference mitigation procedure to mitigate further interference at the first or second radios. As an example, the electronic computing device 120 may inform a radio user operating an interfering radio (e.g., radio 110-A) about the signal interference caused to radios (e.g., radio 110-B) affiliated with other talkgroups by PTT operations performed at the interfering radio. In this example, the electronic computing device 120 may transmit an electronic notification (e.g., via LTE network) to the interfering radio along with location information identifying a location at which signal interference was detected. The electronic computing device 120 may additionally or alternatively transmit an electronic notification to other users, for example, an incident commander, dispatcher, or radio administrator about the signal interference caused to radios. The electronic notification may include information identifying one or more of the radios (e.g., radio 110-B) which were affected by signal interference, interfering radios (e.g., radios 110-A, 110-C), a location at which the radios experienced signal interference, talkgroup identifiers identifying the talkgroups with which the interfering radios as well as the affected radios are affiliated, and instructions to mitigate further interference at the interfering radios or affected radios. For example, the instructions to mitigate further interference may include one or more of tuning transmission power, tuning spur killer setting, changing channel frequency, tuning receiver, tuning antenna, tuning power amplifier biasing, tuning filter, switching bearer, and changing from narrowband communication mode to broadband communication mode.

In accordance with some embodiments, when the cause of interference is crosstalk (e.g., crosstalk due to spurs/harmonics/intermodulation) resulting in sudden unmute of audio communications received at a second radio (e.g., radio 110-B) which is potentially caused by a PTT key-up operation at a first radio (e.g., radio 110-A) or when the cause of interference is crosstalk resulting in a sudden change in audio quality (e.g., PSEQ values dropping more than a threshold of 1.5 or RSSI value dropping below a threshold of −450 dBm), the electronic computing device 120 may select one or more mitigation models to mitigate further interference at the first or second radios. The mitigation models for mitigating crosstalk signal interference may include, but not limited to: (i) tuning spur killer setting at the first radio ((which is potentially causing signal interference at the second radio) to lower spur level of the spur frequency that causes the interference generated at the first radio (ii) tuning harmonic filter setting at the first radio to lower spur level of the spur frequency that causes the interference generated at the first radio, (iii) changing reception channel frequency on which talkgroup communications are received so that all radios affiliated with the same talkgroup as the first radio will migrate to another reception channel frequency to receive audio communications from the first radio; (iv) tuning power amplifier (PA) biasing to lower spur level of the spur frequency that causes the interference generated the first radio. As another example, when the cause of signal interference is blocking resulting in sudden muting of audio communications at a second radio which is potentially caused by a PTT key-up operation at a first radio or when the cause of interference is blocking resulting in sudden drop of PSEQ values (e.g., PSEQ values dropping more than value of 1.5) and sudden spike of RSSI values (e.g., RSSI values above a threshold of −45 dBM), then the electronic computing device 120 may select one or more mitigation models to mitigate further interference at the first or second radios. The mitigation models for mitigating a blocking signal interference may include one or more of: (i) tuning reception front end filter at receiving radios for better rejection of the specific transmission channel frequency operated by the first radio (ii) tuning transmission power which involves determining that all the radios affiliated with the same talkgroup as the first radio are geographically co-located to one another and in response tuning the transmission power of the first radio (which is potentially causing signal interference at the second radio) to a lower power that would be sufficient enough to cover the talkgroup range; (iii) switching from narrowband mode to broadband communication mode which involves determining that the radios affiliated with the same talkgroup as the first radio are not geographically co-located to one another and as requiring highest transmission power and responsively switching the second radio to enter broadband communication mode.

Figure 6:
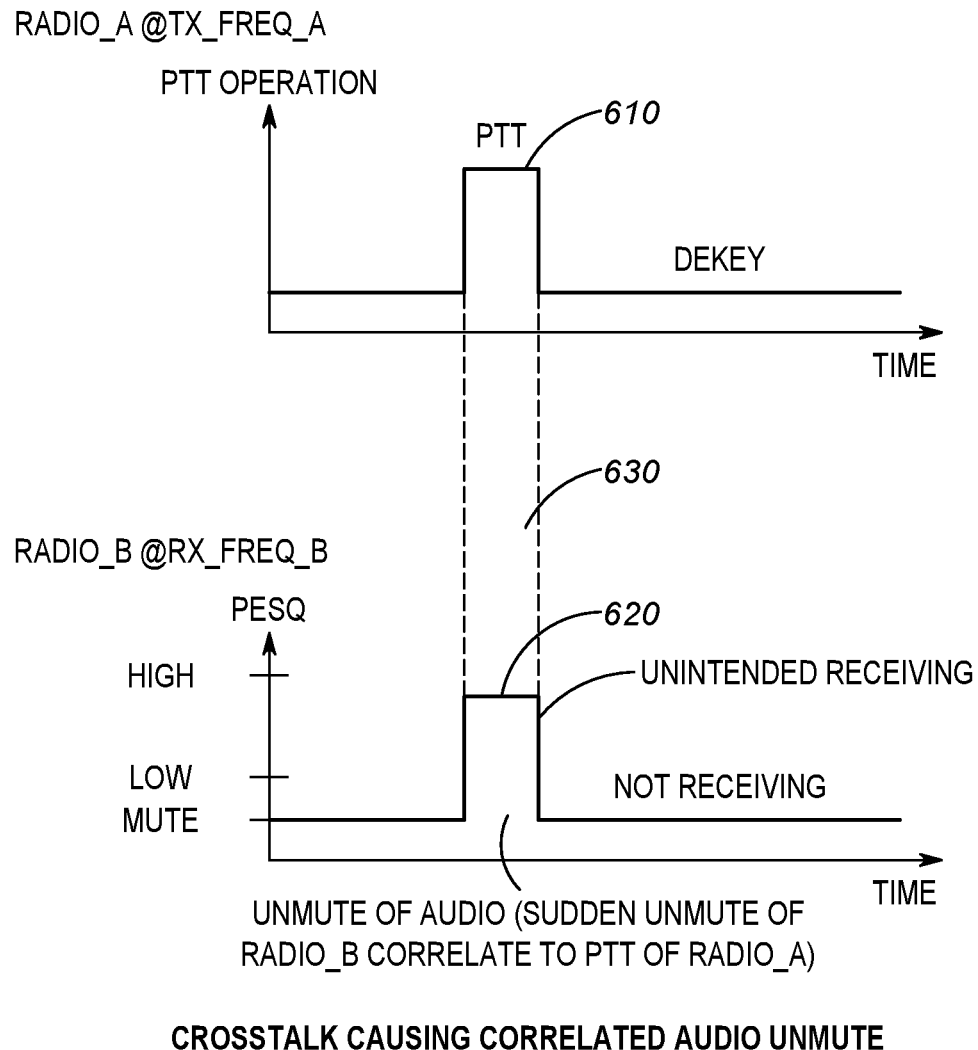
FIG. 6 is a timing diagram illustrating an example time correlation between a PTT key-up operation performed at a first radio and unintended audio communications received at a second radio.

Referring to FIG. 6, a timing diagram 600 illustrating an example time correlation 630 between a PTT key-up operation 610 performed at a first radio (e.g., radio 110-A) and a change in audio quality 620 at a second radio (e.g., radio 110-B). The first radio ("radio_A") is affiliated with a first talkgroup and further operates on a first channel frequency ("Tx_Freq_A"). The second radio ("radio_B") is affiliated with a second talkgroup and further operates on a second channel frequency ("Rx_Freq_B"). In the example shown in FIG. 6, the electronic computing device 120 detects that the cause of signal interference at the second radio is crosstalk when the electronic computing device 120 determines that the change in audio quality 620 at the second radio is due to unintended audio communications (i.e., due to sudden unmuting of audio communications) received at the second radio.

Figure 7:
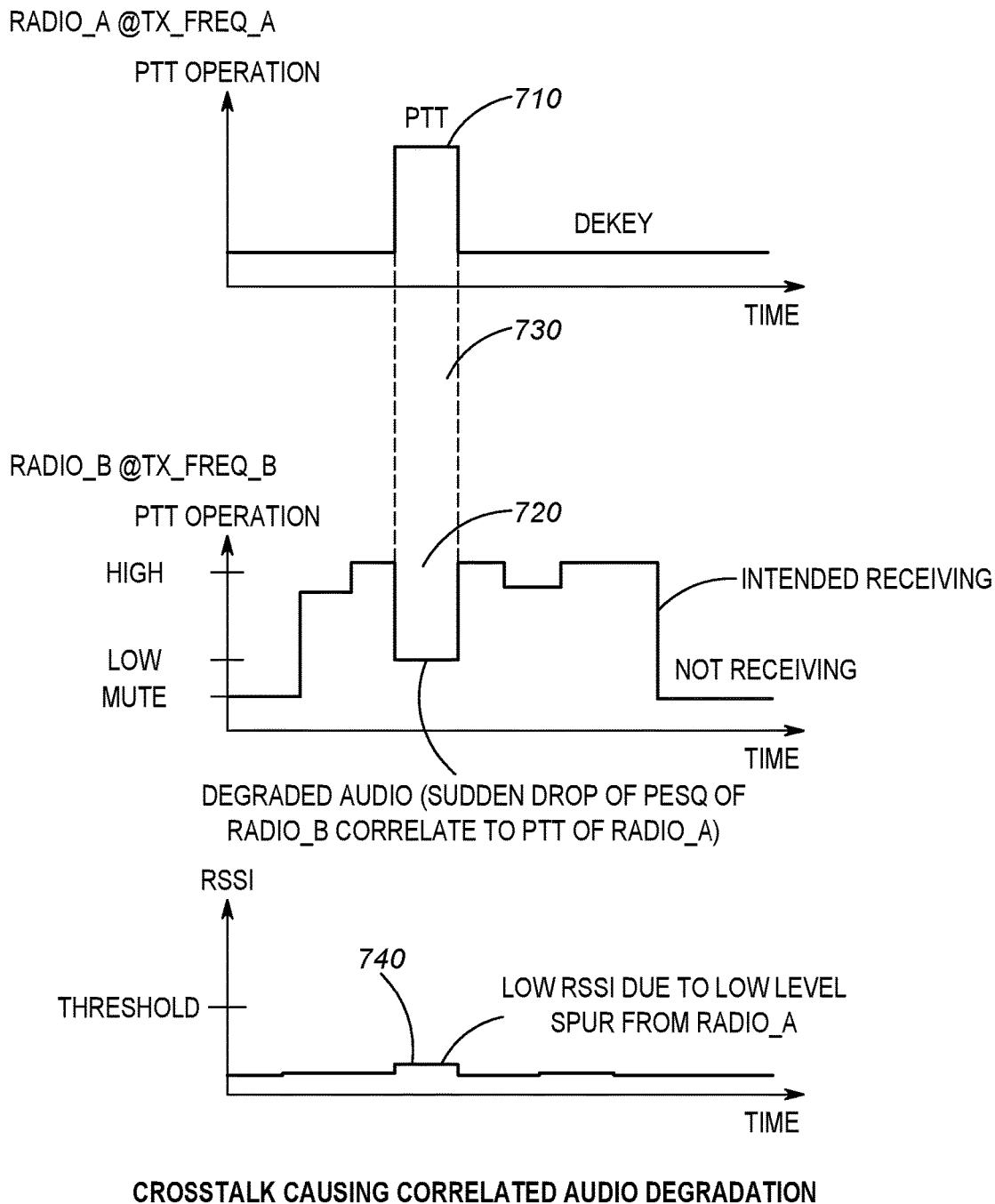
FIG. 7 is a timing diagram illustrating an example time correlation between a PTT key-up operation performed at a first radio and degradation of audio communications received at a second radio.

FIG. 7 is a timing diagram 700 illustrating an example time correlation 730 between a PTT key-up operation 710 performed at a first radio (e.g., radio 110-A) and a change in audio quality 720 received at a second radio (e.g., radio 110-B). The first radio ("radio_A") is affiliated with a first talkgroup and further operates on a first channel frequency ("Tx_Freq_A"). The second radio ("radio_B") is affiliated with a second talkgroup and further operates on a second channel frequency ("Rx_Freq_B"). In the example shown in FIG. 7, the electronic computing device 120 detects that the cause of signal interference at the second radio is crosstalk when the electronic computing device 120 determines that the change in audio quality 720 is due to degradation of audio communications received at the second radio and further when a RSSI value 740 detected at the second radio corresponding to a time period of the change in audio quality 720 is lower than a predefined RSSI threshold (e.g., −450 dBM).

FIG. 8 is a timing diagram 800 illustrating an example time correlation 840 between PTT key-up operations 810, 820 respectively performed at first and second radios (e.g., radios 110-A, 110-B) and a change in audio quality 830 detected at a third radio (e.g., radio 110-C). The first radio ("radio_A") is affiliated with a first talkgroup and further operates on a first channel frequency ("Tx_Freq_A"). The second radio ("radio_B") is affiliated with a second talkgroup and further operates on a second channel frequency ("Rx_Freq_B"). The third radio ("radio_C") is affiliated with a third talkgroup and further operates on a third channel frequency ("Rx_Freq_C"). In the example shown in FIG. 8, the electronic computing device 120 detects that the cause of signal interference at the third radio is crosstalk when the electronic computing device 120 determines that the change in audio quality 830 at the third radio is due to unintended audio communications (i.e., due to sudden unmuting of audio communications) received at the third radio. In this example, the PTT operations 810, 820 respectively of the first and second radios 110-A, 110-B causes intermodulation of spurs from the first and second radios 110-A, 110-B. The resulting intermodulation spur falls on the third radio 110-C receiving channel frequency, thereby causing the third radio 110-C to unmute unintentionally.

Figure 9:
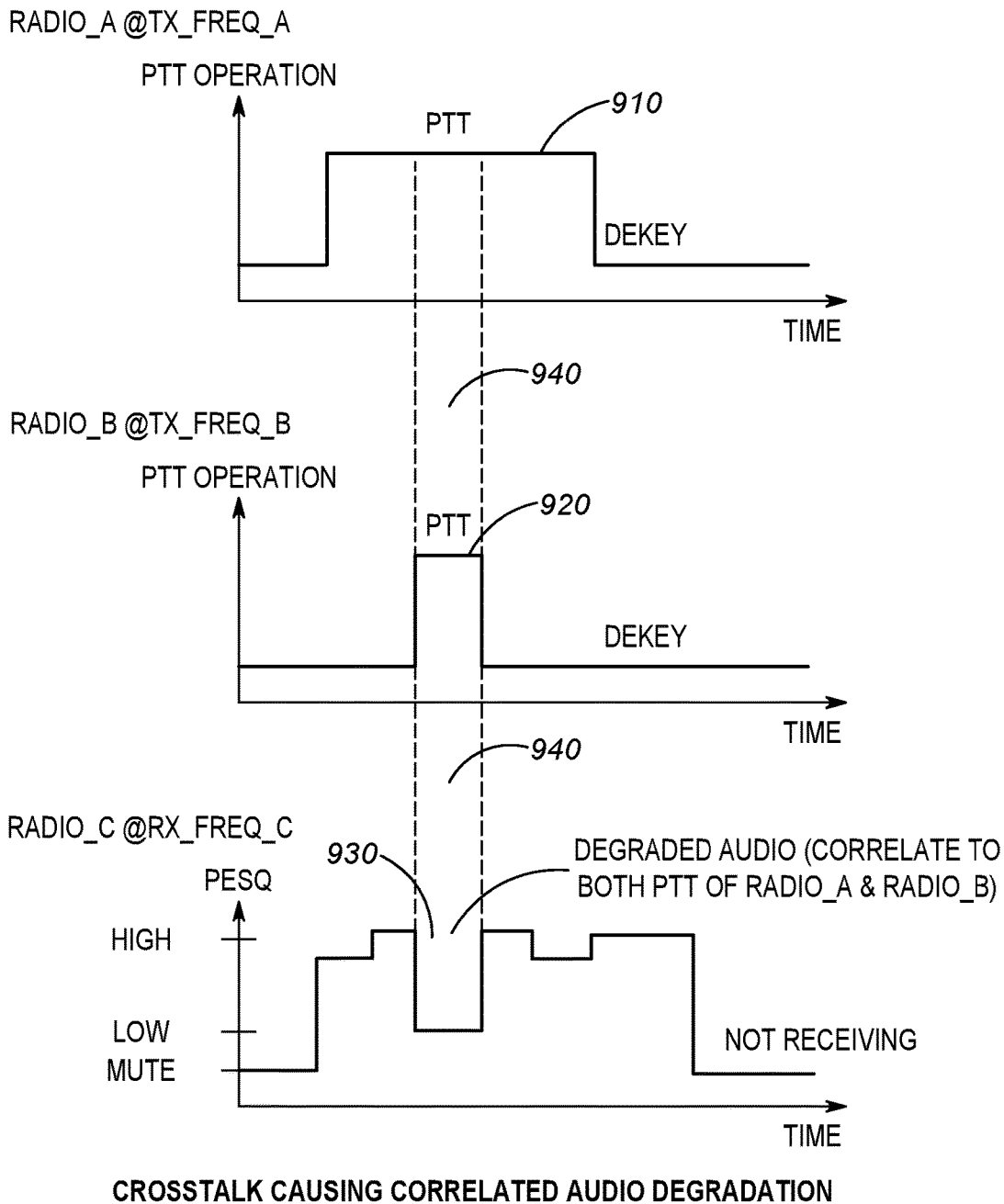
FIG. 9 is a timing diagram illustrating an example time correlation between PTT key-up operations performed at first and second radios and degradation of audio communications received at a third radio.

FIG. 9 is a timing diagram 900 illustrating an example time correlation 940 between PTT key-up operations 910, 920 respectively performed at first and second radios (e.g., radios 110-A, 110-B) and a change in audio quality 930 detected at a third radio (e.g., radio 110-C). The first radio ("radio_A") is affiliated with a first talkgroup and further operates on a first channel frequency ("Tx_Freq_A"). The second radio ("radio_B") is affiliated with a second talkgroup and further operates on a second channel frequency ("Rx_Freq_B"). The third radio ("radio_C") is affiliated with a third talkgroup and further operates on a third channel frequency ("Rx_Freq_C"). In the example shown in FIG. 9, the electronic computing device 120 detects that the cause of signal interference at the third radio is crosstalk when the electronic computing device 120 determines that the change in audio quality 930 is due to degradation of audio communications received at the third radio and further when a RSSI value (not shown) detected at the third radio corresponding to a time period of the change in audio quality 930 is lower than a predefined RSSI threshold (e.g., −45 dBM). In this example, the PTT operations 910, 920 respectively of the first and second radios 110-A, 110-B causes intermodulation of spurs from the first and second radios 110-A, 110-B. The resulting intermodulation spur falls on the third radio 110-C receiving channel frequency, thereby causing degradation of audio quality at the third radio 110-C on its intended audio communications received on the third talkgroup.

Figure 10:
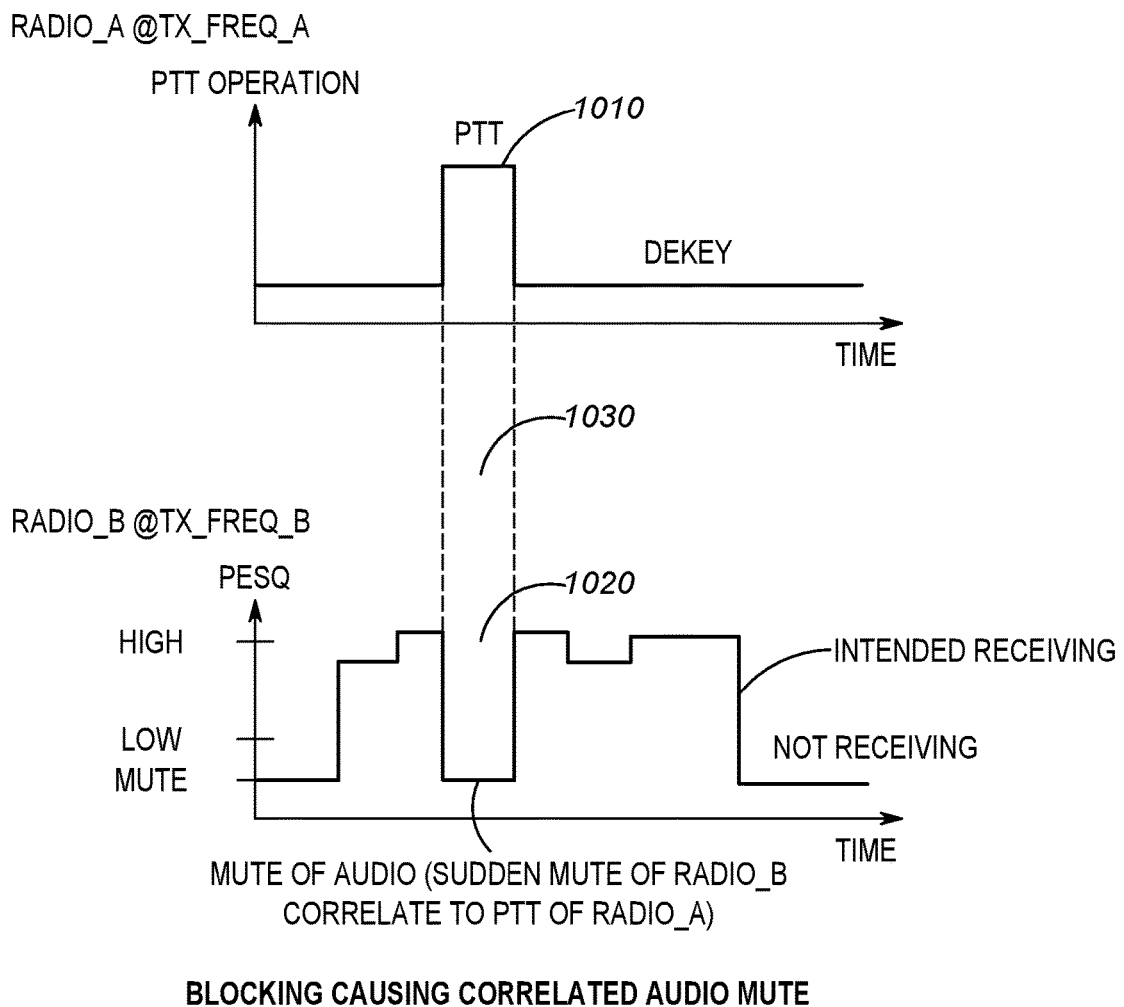
FIG. 10 is a timing diagram illustrating an example time correlation between PTT key-up operation performed at a first radio and a sudden muting of audio communications received at a second radio.

FIG. 10 is a timing diagram 1000 illustrating an example time correlation 1030 between PTT key-up operation 1010 performed at a first radio (e.g., radio 110-A) and a change in audio quality 1020 at a second radio (e.g., radio 110-B). The first radio ("radio_A") is affiliated with a first talkgroup and further operates on a first channel frequency ("Tx_Freq_A"). The second radio ("radio_B") is affiliated with a second talkgroup and further operates on a second channel frequency ("Rx_Freq_B"). In the example shown in FIG. 10, the electronic computing device 120 detects that the cause of signal interference at the second radio is blocking when the electronic computing device 120 detects that the change in audio quality 1020 at the second radio is due to a sudden muting of audio communications received at the second radio. In this example, the high radio frequency (RF) power transmitted by the first radio 110-A drives the receiving circuit of the second radio 110-B into nonlinear saturation region thus causing receive sensitivity degradation of intended audio communications received on the second talkgroup.

Figure 11:
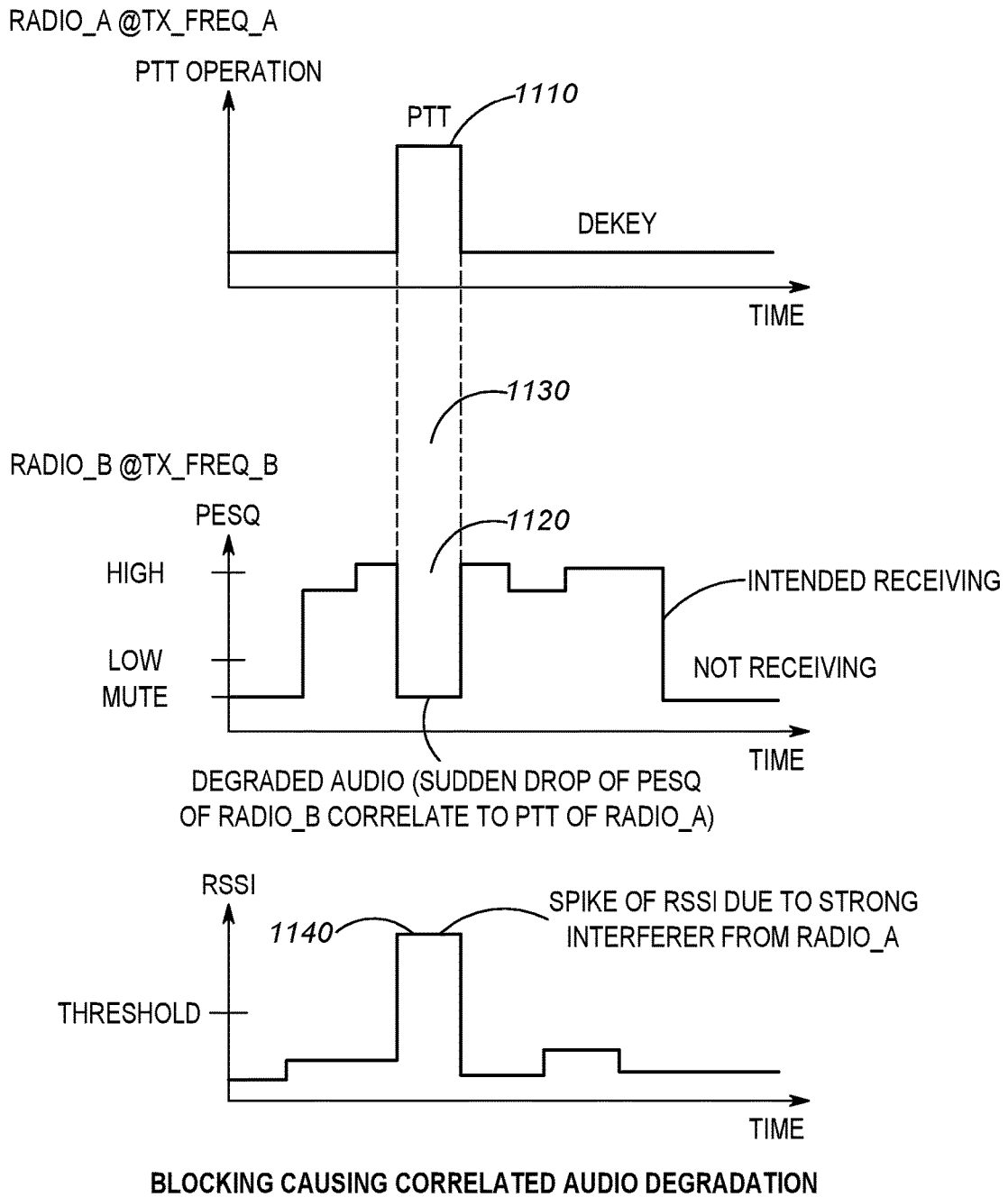
FIG. 11 is a timing diagram illustrating an example time correlation between PTT key-up operation performed at a first radio and degradation of audio communications received at a second radio.

FIG. 11 is a timing diagram 1100 illustrating an example time correlation 1130 between PTT key-up operation 1110 performed at a first radio (e.g., radio 110-A) and a change in audio quality 1120 received at a second radio (e.g., radio 110-B). The first radio ("radio_A") is affiliated with a first talkgroup and further operates on a first channel frequency ("Tx_Freq_A"). The second radio ("radio_B") is affiliated with a second talkgroup and further operates on a second channel frequency ("Rx_Freq_B"). In the example shown in FIG. 11, the electronic computing device 120 detects that the cause of signal interference at the second radio is blocking when the electronic computing device 120 determines that the change in audio quality 1120 is due to degradation of audio communications received at the second radio and further when a RSSI value 1140 detected at the second radio corresponding to a time period of the change in audio quality 720 is higher than a predefined RSSI threshold (e.g., −450 dBM).

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of detecting signal interference among geographically co-located radios affiliated with different talkgroups, the method comprising:
   receiving, at an electronic computing device, a log of push-to-talk (PTT) operations performed at a first radio while the first radio is affiliated with a first talkgroup, wherein the first radio operates on a first channel frequency assigned to the first talkgroup;
   receiving, at the electronic computing device, a log of audio quality values measured corresponding to audio communications received at a second radio while the second radio is affiliated with a second talkgroup, wherein the second radio operates on a second channel frequency assigned to the second talkgroup;
   determining, at the electronic computing device, that the audio quality values indicate a change in audio quality exceeding a predetermined audio quality threshold; and
   detecting, at the electronic computing device, that signal interference at the second radio is potentially caused by the first radio when there is a time correlation between at least one of the PTT operations performed at the first radio and the change in audio quality at the second radio and further when the second radio was geographically co-located with the first radio during the time correlation.

2. The method of claim 1, further comprising:
   responsive to detecting the signal interference at the second radio, initiating an interference mitigation procedure to mitigate further interference at the first or second radios.

3. The method of claim 1, wherein the log of PTT operations includes a type of PTT operation performed at the first radio.

4. The method of claim 3, wherein the log of PTT operations further includes information related to one or more of: a timestamp indicating a time at which the PTT operation was performed, device identifier assigned to the first radio, location of the first radio during the time at which the PTT operation was performed, talkgroup identifier identifying the first talkgroup, and the first channel frequency assigned to the first talkgroup.

5. The method of claim 3, wherein the type of PTT operations is one of a PTT key-up operation or a PTT key-release operation.

6. The method of claim 5, wherein performing the PTT key-up operation at the first radio results in acquiring and transmitting at the first channel frequency for audio transmission to other radios that are affiliated with the first talkgroup.

7. The method of claim 5, wherein performing the PTT key-release operation at the first radio results in releasing the first channel frequency and further ceasing audio transmission of audio communications to other radios that are affiliated with the first talkgroup.

8. The method of claim 1, wherein the log of audio quality values includes perceptual evaluation of speech quality (PESQ) values.

9. The method of claim 8, wherein the log of audio quality values further include information related to one or more of: received signal strength indication (RSSI) values, a timestamp indicating a time at which the PESQ and RSSI values were measured, device identifier assigned to the second radio, location of the second radio during the time at which the PESQ and RSSI values were measured, talkgroup identifier identifying the second talkgroup, and the second channel frequency assigned to the second talkgroup.

10. The method of claim 1, further comprising:
responsive to detecting the signal interference at the second radio, identifying a cause of interference detected at the second radio.

11. The method of claim 10, wherein identifying the cause of interference comprises:
identifying that the at least one of the PTT operations is a PTT key-up operation;
determining that the change in audio quality at the second radio is due to unintended audio communications received at the second radio; and
identifying that the cause of interference is crosstalk.

12. The method of claim 10, wherein identifying the cause of interference comprises:
identifying that the at least one of the PTT operations is a PTT key-up operation;
determining that the change in audio quality at the second radio is due to degradation of audio communications received at the second radio;
determining whether a received signal strength indication (RSSI) value detected at the second radio corresponding to a time period of the change in audio quality is lower than a predefined RSSI threshold;
identifying that the cause of interference is crosstalk when the RSSI value is lower than the predefined RSSI threshold; and
identifying that the cause of interference is blocking when the RSSI value is not lower than the predefined RSSI threshold.

13. The method of claim 10, wherein identifying the cause of interference comprises:
identifying that the at least one of the PTT operations is a PTT key-up operation;
determining that the change in audio quality at the second radio is due to a sudden muting of audio communications received at the second radio; and
responsively identifying that the cause of interference is blocking.

14. The method of claim 10, further comprising:
receiving, at the electronic computing device, a log of push-to-talk (PTT) operations performed at a third radio while the third radio is affiliated with a third talkgroup, wherein the third radio operates on a third channel frequency assigned to the third talkgroup; and
detecting, at the electronic computing device, that the signal interference at the second radio is potentially caused by an intermodulation of signals between the first and third radios when there is a time correlation between at least one of the PTT operations performed at the first radio, at least one of the PTT operations performed at the third radio, and the change in audio quality at the second radio and further when the second radio is geographically co-located with the first and third radios during the time correlation.

15. An electronic computing device, comprising:
a communications interface; and
an electronic processor communicatively coupled to the communications interface, the electronic processor configured to:
receive, via the communications interface, a log of push-to-talk (PTT) operations performed at a first radio while the first radio is affiliated with a first talkgroup, wherein the first radio operates on a first channel frequency assigned to the first talkgroup;
receiving, via the communications interface, a log of audio quality values measured corresponding to audio communications received at a second radio while the second radio is affiliated with a second talkgroup, wherein the second radio operates on a second channel frequency assigned to the second talkgroup;
determine that the audio quality values indicate a change in audio quality exceeding a predetermined audio quality threshold; and
detect that a signal interference at the second radio is potentially caused by the first radio when there is a time correlation between at least one of the PTT operations performed at the first radio and the change in audio quality at the second radio and further when the second radio was geographically co-located with the first radio during the time correlation.

16. The electronic computing device of claim 15, wherein the electronic processor is configured to initiate an interference mitigation procedure to mitigate further interference at the first or second radios.

17. The electronic computing device of claim 15, wherein the electronic processor is configured to identify a cause of interference detected at the second radio.

18. The electronic computing device of claim 17, wherein the electronic processor is configured to:
identify that the at least one of the PTT operations is a PTT key-up operation;
determine that the change in audio quality at the second radio is due to unintended audio communications received at the second radio; and
identify that the cause of interference is crosstalk.

19. The electronic computing device of claim 17, wherein the electronic processor is configured to:
identify that the at least one of the PTT operations is a PTT key-up operation;
determine that the change in audio quality at the second radio is due to degradation of audio communications received at the second radio;
determine whether a received signal strength indication (RSSI) value detected at the second radio corresponding to a time period of the change in audio quality is lower than a predefined RSSI threshold;
identify that the cause of interference is crosstalk when the RSSI value is lower than the predefined RSSI threshold; and identify that the cause of interference is blocking when the RSSI value is not lower than the predefined RSSI threshold.

20. The electronic computing device of claim 17, wherein the electronic processor is configured to:
identify that the at least one of the PTT operations is a PTT key-up operation;
determine that the change in audio quality at the second radio is due to a sudden muting of audio communications received at the second radio; and
identify that the cause of interference is blocking.

* * * * *